United States Patent
Cunningham et al.

(10) Patent No.: US 12,468,308 B2
(45) Date of Patent: Nov. 11, 2025

(54) VEHICLE CARWASH DETECTION AND ENTRY ASSISTANCE SYSTEM AND METHOD

(71) Applicant: GM GLOBAL TECHNOLOGY OPERATIONS LLC, Detroit, MI (US)

(72) Inventors: Chad R Cunningham, Shelby Township, MI (US); Brenton John Sirowatka, Clarkston, MI (US)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 209 days.

(21) Appl. No.: 18/331,423

(22) Filed: Jun. 8, 2023

(65) Prior Publication Data
US 2024/0411312 A1    Dec. 12, 2024

(51) Int. Cl.
| | |
|---|---|
| B60S 3/04 | (2006.01) |
| B60W 10/06 | (2006.01) |
| B60W 10/08 | (2006.01) |
| B60W 10/18 | (2012.01) |
| B60W 10/20 | (2006.01) |
| B60W 10/30 | (2006.01) |
| B60W 30/18 | (2012.01) |
| B60W 50/14 | (2020.01) |
| G05D 1/00 | (2024.01) |
| G06V 10/12 | (2022.01) |
| G06V 10/764 | (2022.01) |
| G06V 20/56 | (2022.01) |

(52) U.S. Cl.
CPC ............ *G05D 1/0276* (2013.01); *B60S 3/04* (2013.01); *B60W 50/14* (2013.01); *G06V 20/56* (2022.01); *B60W 2050/146* (2013.01)

(58) Field of Classification Search
CPC ... B60S 3/04; B60W 50/14; B60W 2050/146; B60W 30/18009; B60W 10/06; B60W 10/08; B60W 10/10; B60W 10/18; B60W 10/20; B60W 10/30; B60W 2420/54; B60W 2520/10; B60W 2555/20; B60W 2710/06; B60W 2710/08; B60W 2710/10; B60W 2710/18; B60W 2710/20; B60W 2710/30; G05D 1/0276; G06V 20/56; G06V 10/12; G06V 10/764
USPC .......................................... 701/23
See application file for complete search history.

(56) References Cited

U.S. PATENT DOCUMENTS

| | | | |
|---|---|---|---|
| 2014/0048104 A1* | 2/2014 | Stadler ...................... | B60S 3/04 134/18 |
| 2017/0337815 A1* | 11/2017 | Reed, III .................. | B60S 3/04 |
| 2018/0194344 A1* | 7/2018 | Wang ....................... | G05D 1/027 |
| 2020/0282958 A1* | 9/2020 | Stephenson ............. | G06V 20/00 |
| 2020/0324740 A1* | 10/2020 | Dietsch .................... | B60S 3/042 |
| 2021/0188321 A1* | 6/2021 | Palazzolo ................. | G06T 7/73 |

(Continued)

*Primary Examiner* — Rachid Bendidi
*Assistant Examiner* — Hossam M Abd El Latif
(74) *Attorney, Agent, or Firm* — Ingrassia Fisher & Lorenz, LLP | IF&L (57) ABSTRACT

Systems and method are provided for carwash detection and entry assistance of a vehicle. A system includes a controller that operates to identify the presence of the vehicle at a wash facility, and to determine whether an operator of the vehicle has accepted entry assistance. When the operator has accepted entry assistance, the controller prepares the vehicle for entering the wash facility, determines a path into the wash facility, and assists the operator in entering the vehicle into the wash facility via the path.

20 Claims, 3 Drawing Sheets

(56) References Cited

U.S. PATENT DOCUMENTS

| | | | |
|---|---|---|---|
| 2022/0333941 A1* | 10/2022 | Okubo | G01C 21/3407 |
| 2023/0234551 A1* | 7/2023 | Kang | B60W 50/08 |
| | | | 701/1 |
| 2023/0311893 A1* | 10/2023 | An | B60W 50/0098 |
| | | | 701/1 |

* cited by examiner

VEHICLE CARWASH DETECTION AND ENTRY ASSISTANCE SYSTEM AND METHOD

INTRODUCTION

The present disclosure generally relates to vehicles with advanced driver assistance capability, and more particularly relates to systems and methods for detecting the incipient entry of the vehicle into a car wash and assisting with preparation of the vehicle and entry into the car wash.

Advanced driver assistance systems and autonomous systems collect information about the vehicle and its environment and may assist the driver in performing operations or may automatically control the vehicle. These vehicles sense their environment using sensing devices such as radar, lidar, image sensors, ultrasonic devices and others. These vehicles may use information from global positioning systems (GPS) technology, navigation systems, vehicle-to-vehicle communication, vehicle-to-infrastructure technology, and/or drive-by-wire systems to determine actions, such as to navigate.

To achieve high level automation, vehicles are often equipped with an increasing number of different types of devices for analyzing the environment around the vehicle, such as, for example, cameras or other imaging devices capturing imagery of the environment, radar or other ranging devices for surveying or detecting features within the environment, and the like. In addition, a number of actuators are used to control the vehicle in response to numerous programs and algorithms. The automated operation of vehicles for certain optional purposes may require making specific determinations. For example, parking a vehicle requires identifying a non-occupied parking space. Other optional purposes may require other specific determinations. For example, operations associated with a car wash purpose may desirably be specified.

Accordingly, it is desirable to provide for automated vehicle operations associated with the purpose of washing the vehicle. Other desirable features and characteristics of the present disclosure will become apparent from the subsequent detailed description and the appended claims, taken in conjunction with the accompanying drawings and the foregoing introduction.

SUMMARY

Systems and method are provided for carwash detection and entry assistance of a vehicle. In a number of embodiments, a system includes a controller that operates to identify the presence of the vehicle at a wash facility, and to determine whether an operator of the vehicle has accepted entry assistance. When the operator has accepted entry assistance, the controller prepares the vehicle for entering the wash facility, determines a path into the wash facility, and assists the operator in entering the vehicle into the wash facility via the path.

In additional embodiments, the controller prepares the vehicle for entering the wash facility by moving components of the vehicle to predetermined positions compatible with entering the wash facility.

In additional embodiments, the controller operates a steering actuator of the vehicle to align the vehicle in the wash facility using the path.

In additional embodiments, the controller identifies attributes of the wash facility for use in determining the path.

In additional embodiments, the controller, as a part of preparing the vehicle for entering the wash facility, operates a mirror actuator to fold mirrors against the vehicle.

In additional embodiments, the controller, through an interface, alerts the operator to release a steering system so that the controller steers the vehicle.

In additional embodiments, a sensor system senses a location of a rail of the wash facility. An actuator system operates components of the vehicle. The controller determines the path based on the location of the rail and moves, by the actuator system, the vehicle into the wash facility along the path.

In additional embodiments, an interface displays information for the operator, and the controller displays the path on the interface.

In additional embodiments, a sensor system includes a speed sensor, and the vehicle includes a transmission. The controller senses, via the sensor system, attributes of the wash facility, determines, via the speed sensor, and a speed of the vehicle. The controller shifts the transmission to a park state or a neutral state, as a function of the sensed attributes, and when the speed of the vehicle is a zero speed.

In additional embodiments, the controller prepares the vehicle for entering the wash facility by moving components of the vehicle to predetermined positions compatible with entering the wash facility. The controller determines when the vehicle has exited the wash facility. When the vehicle has exited the wash facility, the controller returns the components of the vehicle to a prewash state, which is a position of the components of the vehicle before entering the wash facility.

In a number of other embodiments, a method for carwash detection and entry assistance includes identifying, by a controller, the presence of the vehicle at a wash facility. The controller determines whether an operator of the vehicle has accepted entry assistance. When the operator has accepted entry assistance, the controller prepares the vehicle for entering the wash facility. The controller determines a path into the wash facility and assists the operator in the vehicle entering the wash facility via the path.

In additional embodiments, the controller prepares the vehicle for entering the wash facility by moving components of the vehicle to predetermined positions compatible with entering the wash facility.

In additional embodiments, the controller operates a steering actuator of the vehicle to align the vehicle in the wash facility using the path.

In additional embodiments, the controller identifies attributes of the wash facility for use in determining the path.

In additional embodiments, the controller operates a mirror actuator to fold mirrors against the vehicle as a part of the preparing the vehicle for entering the wash facility.

In additional embodiments, the controller alerts, through an interface, the operator to release a steering system so that the controller steers the vehicle.

In additional embodiments, the controller via a sensor system, senses a location of a rail of the wash facility. The controller via an actuator system, operates components of the vehicle. The controller determines the path based on the location of the rail. The controller via the actuator system, moves the vehicle into the wash facility along the path.

In additional embodiments, the controller via an interface, displays information for the operator including the path.

In additional embodiments, the controller via a sensor system, senses attributes of the wash facility. The controller via a speed sensor, determines a speed of the vehicle. The controller via a transmission, shifts to a park state or a neutral state, as a function of the sensed attributes and when the speed of the vehicle is a zero speed.

In a number of additional embodiments, a vehicle includes wash detection and entry assistance. The vehicle includes a sensing system to sense attributes of the vehicle and of an environment surrounding the vehicle. An actuator system operates features of the vehicle. A controller identifies the presence of the vehicle at a wash facility and determines whether an operator of the vehicle has accepted entry assistance. When the operator has accepted entry assistance, the controller prepares the vehicle for entering the wash facility by moving components of the vehicle to predetermined positions compatible with entering the wash facility. The controller determines a path into the wash facility, assists the operator in entering the vehicle into the wash facility via the path, and determines when the vehicle has exited the wash facility. When the vehicle has exited the wash facility, the controller returns the components of the vehicle to a prewash state which is a position of the components of the vehicle before entering the wash facility.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, imaging, ranging, synchronization, calibration, control systems, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
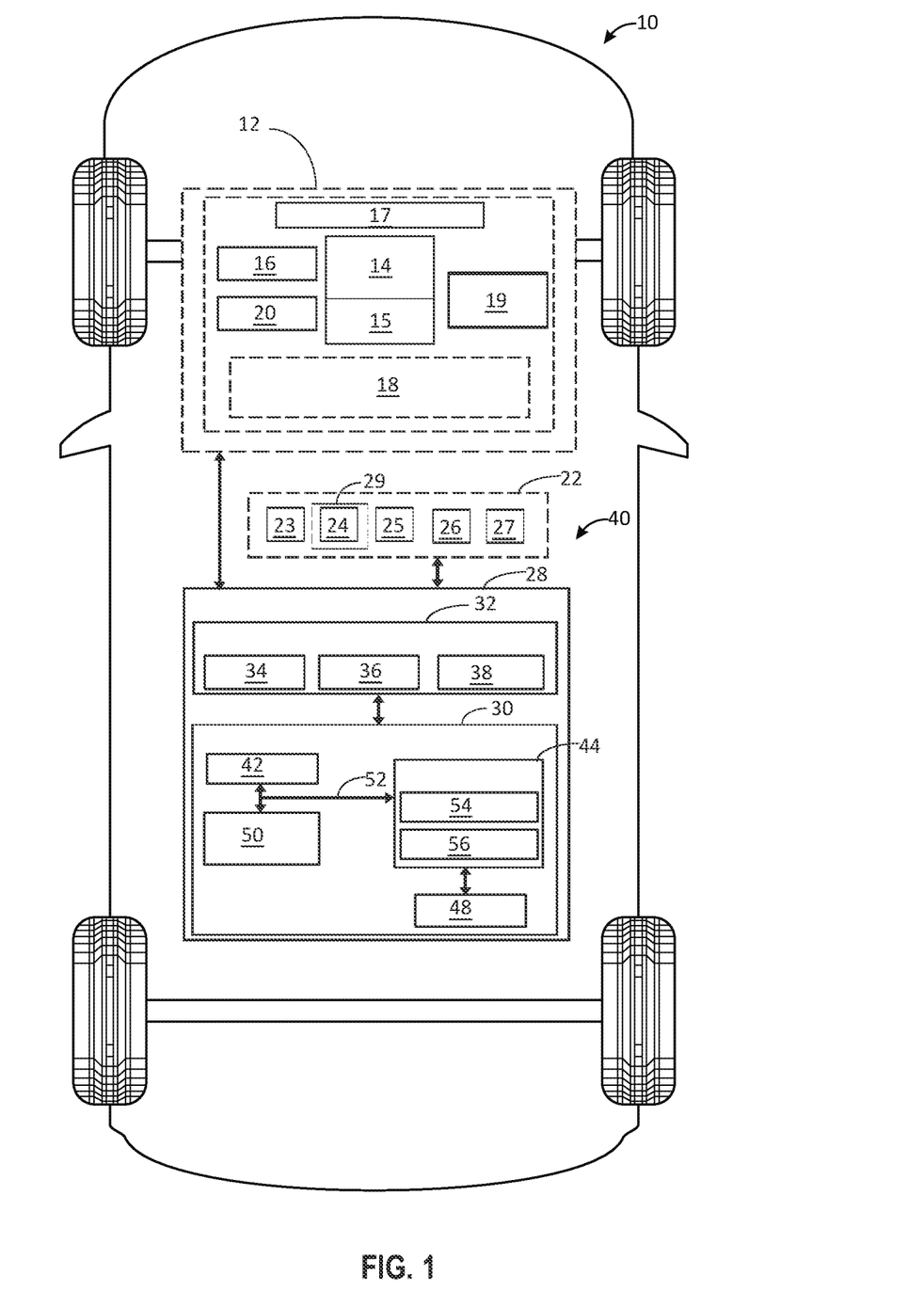
FIG. 1 is a functional block diagram illustrating an autonomous vehicle for collecting data, in accordance with various embodiments.

Referring to FIG. 1, in one or more exemplary embodiments a vehicle 10 is illustrated. The vehicle 10 has a powertrain system 12 that may be configured in any of a variety of forms to provide torque to propel the vehicle 10. In various embodiments, the powertrain system 12 includes a prime mover 14 controlled to provide torque based on a requested or commanded load. The load may be based on a driver request or on an autonomous input for torque and/or speed. To deliver the requested torque and/or speed from the prime mover 14, a transmission 15 may be included in the powertrain system 12. The transmission 15 may operate to provide forward operation of the vehicle 10, reverse operation of the vehicle 10, a park state, a neutral state, and a number of speed ratios for the output from the prime mover 14 where power may be transferred to the wheels of the vehicle 10. When the transmission 15 is selectively placed in the park state or in the neutral state, power/torque is not delivered to the wheels of the vehicle 10.

In certain embodiments, the vehicle 10 comprises an automobile. As will be appreciated, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 10 may also comprise a truck and/or one or more other types of vehicles.

In the depicted embodiment, the vehicle 10 includes a body that substantially encloses other components of the vehicle 10. Also in the depicted embodiment, the vehicle 10 includes a plurality of axles and wheels. The wheels are each rotationally coupled to one or more of the axles near a respective corner of the body to facilitate movement of the vehicle 10. In one embodiment, the vehicle 10 includes four wheels, although this may vary in other embodiments (for example for trucks and certain other vehicles).

The vehicle 10 further includes a control system 28 associated with the various systems of the vehicle 10. Responsive to the control system 28, an actuator system 22 may include various actuators to operate components of the vehicle 10. The actuator system 22 may include a brake actuator 23 to slow the vehicle 10, a steering actuator 24 of a steering system 29 to turn the wheels of the vehicle 10, mirror actuators 25 to fold the outside rearview mirrors, a roof panel actuator 26 to move a panel such as a sunroof, and other actuators 27 to operate other components or features of the vehicle 10.

Also responsive to the control system 28, the powertrain system 12 may drive the wheels of the vehicle 10 to rotate in a forward direction or a reverse direction. The powertrain system 12 generally includes a number of components and subsystems including the prime mover 14 and the transmission 15.

When the prime mover is an internal combustion engine, the powertrain system 12 may include an ignition system 16, an intake system 17, an exhaust system 18, a fuel system 19, and a valve system 20. In various embodiments, the powertrain system 12 may be a four stroke internal combustion engine in which a piston in each cylinder completes an intake stroke, a compression stroke, a combustion stroke, and an exhaust stroke to drive the prime mover 14. Any number of cylinders may be included in the prime mover 14. The intake system 17 delivers air and controls the air's mass flow rate to the cylinders, such as via a throttle. The fuel system 19 delivers fuel to the cylinders and controls its timing and amount via a number of injectors as further described below. The valve system 20 includes a number of valves to control the flow of air/gases into and out of the cylinders, and the valves may have variable timing. The ignition system 16 is operated to control the timing of, and initiate, combustion in the cylinders. The exhaust system 18 conveys combustion gases from the prime mover 14 to the atmosphere and may include aftertreatment devices.

In other embodiments, the prime mover 14 may be an electric motor, in which case the ignition system 16, the intake system 17, the exhaust system 18, the fuel system 19, and the valve system 20 are not included. In additional embodiments, the prime mover 14 may be configured in a hybrid arrangement with both an internal combustion engine and an electric motor. In additional embodiments, the powertrain system 12 and/or the prime mover 14 may be configured in another form to provide power to propel the vehicle 10.

In various embodiments, the control system 28 provides instructions for controlling various aspects of the vehicle 10 including for controlling a vehicle carwash detection and entry assistance system 40. In general, the vehicle car wash detection and entry assistance system 40 identifies the presence of a carwash in front of the vehicle 10, assists with preparations of the vehicle 10 prior to entering the carwash, assists with maneuvering tasks of the vehicle 10 to enter the carwash at the optimal approach angle, and may assist with operation of the vehicle within, and exit from, the carwash.

In various embodiments, the control system 28 comprises an engine control unit for the prime mover 14. In other embodiments, the control system 28 include a motor controller with power electronics. In other embodiments, the control system 28 is configured for the form of the powertrain system 12 used. Also in various embodiments, among other functionality, the control system 28 selectively controls operation of the powertrain system 12 to achieve desired torque and speed outputs. In various embodiments, the control system 28 provides these functions in accordance with the steps of the method 200 described further below in connection with the FIG. 3.

As depicted in FIG. 1, in various embodiments, the control system 28 includes a controller 30 and a sensor array 32. In various embodiments, the sensor array 32 includes sensors for measuring observable conditions of the vehicle 10, including of the environment surrounding the vehicle 10, and generating sensor data based thereon. The sensing devices in the sensor array 32 may include, but are not limited to, radars, lidars, global positioning systems, optical cameras, thermal cameras, ultrasonic sensors, angle sensors, position sensors, speed sensors, temperature sensors, and/or other sensors. As depicted in FIG. 1, in various embodiments, the sensor array 32 includes one or more vehicle sensors 34. In various embodiments, the vehicle sensors 34 are attached to, disposed within, or otherwise disposed in proximity to the vehicle 10 such that various temperatures, positions, settings, speeds, and other observable parameters are measured.

The sensor array 32 includes one or more environment sensors 36. In various embodiments, the environment sensors 36 are disposed to monitor the surroundings of the vehicle 10 such that various temperatures, positions, characteristics, distances, images, and other observable parameters are measured. In certain embodiments, the sensor array 32 may also include one or more other sensors 38, for example for perceiving and/or communicating information relevant to the vehicle 10, which may include any of the other sensors described herein. For example, in certain embodiments, the other sensors 38 may include one or more sensors and/or transceivers for communicating with global positioning systems, infrastructure, other vehicles, and other functionality as desired. In various embodiments, a control module onboard the autonomous vehicle 10, such as in the controller 30, may use the various onboard sensors in the sensor array 32, and may enable data from those different types of sensors to be spatially or otherwise associated with one another for object detection, object classification, with the purpose of controlling operation of the vehicle 10.

In various embodiments, the controller 30 is coupled with the sensor array 32 and provides instructions for controlling the vehicle 10 and the powertrain system 12 via commands, such as to the actuator system 22, based on the sensor data. As depicted in FIG. 1, the controller 30 comprises a computer system. In certain embodiments, the controller 30 may also include the sensor array 32 and/or one or more other vehicle components. In addition, it will be appreciated that the controller 30 may differ from the embodiment depicted in FIG. 1. For example, the controller 30 may be a group of controllers and/or may be coupled with or may otherwise utilize one or more remote computer systems and/or other control systems, for example as part of one or more of the above-identified vehicle devices and systems.

In the depicted embodiment, the computer system of the controller 30 includes a processor 42, a memory 44, an interface 48, a storage device 50, and a bus 52. The processor 42 performs the computation and control functions of the controller 30 and may comprise any type of processor or multiple processors, single integrated circuits such as a microprocessor, or any suitable number of integrated circuit devices and/or circuit boards working in cooperation to accomplish the functions of a processing unit. During operation, the processor 42 executes one or more programs 54 contained within the memory 44 and, as such, controls the general operation of the controller 30 and the computer system of the controller 30, generally in executing the processes described herein, such as the method 200 discussed further below in connection with FIG. 4.

The memory 44 may be any type of suitable memory. For example, the memory 44 may include various types of dynamic random access memory (DRAM) such as SDRAM, the various types of static RAM (SRAM), and the various types of non-volatile memory (PROM, EPROM, and flash). In certain examples, the memory 44 may be located on and/or co-located on the same computer chip as the processor 42. In the depicted embodiment, the memory 44 stores the above-referenced programs 54 along with stored values 56 (e.g., including, in various embodiments, predetermined threshold values for controlling emissions).

The bus 52 serves to transmit programs, data, status and other information or signals between the various components of the computer system of the controller 30. The interface 48 allows communications with the computer system of the controller 30, such as from/to a vehicle operator and/or another computer system and is implemented using any suitable method and apparatus. In one embodiment, the interface 48 obtains various data from an operator of the vehicle 10 and/or communicates information to the operator. In one example, the interface 48 is a driver information center with a touch screen or other input device(s). In additional embodiments, the interface 48 includes a display screen. In other embodiments, the interface 48 may be any form of human-machine interface that enables human input and that communicates information to a human.

The storage device 50 may be any suitable type of storage apparatus, including various different types of direct access storage and/or other memory devices. In one exemplary embodiment, the storage device 50 comprises a program product from which the memory 44 receives the programs 54 that execute one or more embodiments of one or more processes of the present disclosure, such as the steps of the method 200 discussed further below in connection with FIG. 3. In another exemplary embodiment, the program product may be directly stored in and/or otherwise accessed by the memory 44 and/or the storage device 50 and/or other memory devices. The storage device 50 may also store information collected during operation of the vehicle 10 including data from the sensor array 32 and may be part of the vehicle's logging system. As such, the stored information represents real-world information of actual scenes, objects, functions, and operations.

The bus 52 may be any suitable physical or logical means of connecting computer systems and components. This includes, but is not limited to, direct hard-wired connections, fiber optics, infrared, and wireless bus technologies. During operation, the programs 54 may be stored in the memory 44, communicated via the bus 52, and executed by the processor 42.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 42) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 30 may also otherwise differ from the embodiment depicted in FIG. 1, for example in that the computer system of the controller 30 may be coupled to or may otherwise utilize one or more remote computer systems and/or other control systems.

In various embodiments, one or more instructions of the controller 30 are embodied in the control system 28 (e.g., in storage device 50) and, when executed by the processor 42, cause the processor 42 to detect or identify a stationary or moving condition of the vehicle 10 based on the output data from the sensor array 32 (e.g., a speed sensor, a position sensor, or the like), obtain data captured or generated from imaging and ranging devices of the sensor array 32, and make determinations based thereon. Thereafter, the processor 42 may establish correlations between the stored values 56 and the sensed environment to assign attributes for object detection, object classification, and the like. The resulting objects and their classification may be used in operating the vehicle 10, which, in turn, influences commands generated or otherwise provided by the processor 42 to control actuators of the vehicle 10, such as for steering, braking, acceleration, and for other functions, via the actuator system 22. As the data is captured or generated it is logged and may be stored in the storage device 50, or in other devices of the vehicle 10.

The control system 28 synthesizes and processes data from the sensor array 32 and predicts the presence, location, classification, and/or state of objects, attributes, and features of the environment of the vehicle 10. The control system 28 processes sensor data along with other data to determine a position (e.g., a local position relative to a map, building, address, an exact position relative to lane of a road, vehicle heading, velocity, etc.) of the vehicle 10 relative to the environment. The control system 28 processes sensor data along with other data, such as the stored values 56, to determine control actions for the vehicle 10 to recommend to the driver or to follow autonomously. The vehicle control system 28 generates control signals for controlling the vehicle 10 according to the determinations.

Figure 2:
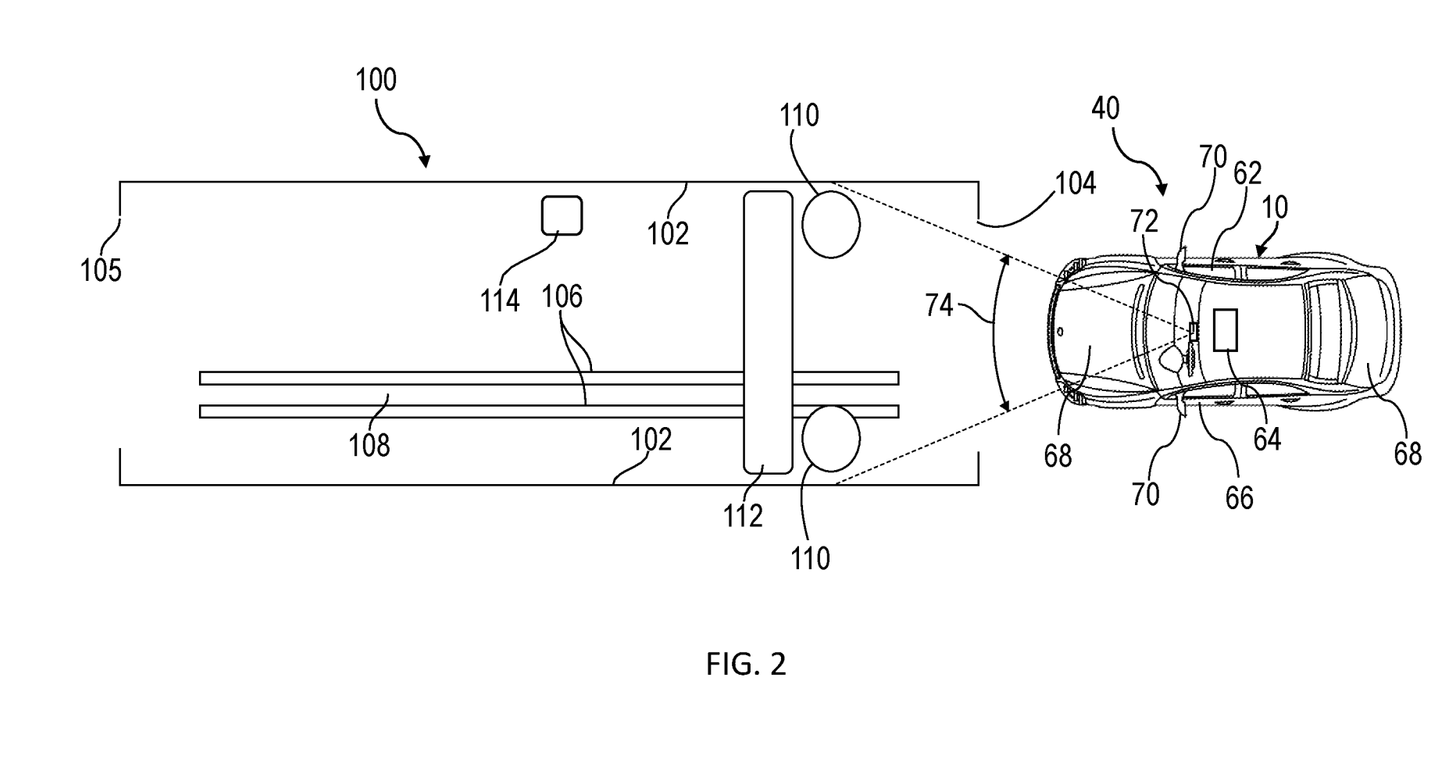
FIG. 2 is a structural flow diagram for a process for controlling alignment of a vehicle during a car wash entry, and that may be implemented in connection with the vehicle of FIG. 1 and components thereof, in accordance with exemplary embodiments.

Referring to FIG. 2 along with FIG. 1, in accordance with various embodiments the vehicle 10 may be presented with a scenario for entering a wash facility designated as a carwash system 100. For example, it may be desirable to periodically, or occasionally, clean the exterior of the vehicle 10 via the automated carwash system 100. An automated carwash system 100 is one where the vehicle 10 is cleaned without the operator/driver performing the cleaning function. The carwash system 100 may have walls 102 defining an enclosed space with an entry opening 104 through which the vehicle 10 is intended to enter and an exit opening 105, through which the vehicle is intended to exit.

The vehicle 10 may include various components or features that are preferably placed, via actuators of the actuator system 22, in a specific state prior to operation of the carwash system 100. This may include moving components of the vehicle 10 to predetermined positions compatible with entering the wash facility (in this example the automated carwash system 100). For example, the vehicle 10 may have windows 62, a roof panel (e.g., sunroof) 64, doors 66, hatches 68 and other features, each of which may be selectively moved. For example. the features may be opened and closed by their actuators, such as by the panel actuator 26 and the other actuators 27. In addition, the vehicle 10 may include outside rearview mirrors 70 that may be selectively folded/unfolded, via the mirror actuators 25, relative to the side of the vehicle 10 by their actuators. The vehicle 10 may have various other components or features such as accessories (e.g., spoilers, antennas, etc.), that are preferably placed in a desired state by the other actuators 27 prior to operation of the carwash system. In some embodiments, the infotainment system of the vehicle 10 may be adjusted to presets saved as part of the vehicle carwash detection and entry assistance system 40.

The vehicle 10, as a part of the sensor array 32, may include a front camera module 72 that captures images of the area in front of the vehicle 10. For example, the front camera module 72 may have a field of view 74 to capture images that may be used by the controller 30 to discern the presence of the carwash system 100. The carwash system 100 may have a number of identifiable attributes for use in determining the presence of the vehicle 10 at the entry to the carwash system 100. For example, the carwash system 100 may have walls 102 defining an entry opening 104. Inside the walls 102, the car wash system may have one or more rails 106 for guiding the wheels of the vehicle 10. In some embodiments, the carwash system 100 may have a conveyor 108 configured to move the vehicle 10 through the carwash system 100. When configured with the conveyor 108, the transmission 15 of the vehicle 10 is preferably placed in neutral for operation of the carwash system 100. In some embodiments, the carwash system 100 may have brushes 110 that clean the sides or other parts of the vehicle 10 and that are identifiable characteristics/attributes. In some embodiments, the car wash system may be configured with a gantry 112 that moves over the vehicle 10. In these gantry embodiments, it may be desirable to move the vehicle 10 into the carwash system 100 and place the transmission 15 in park. The carwash system 100 may also have one or more signals 114. For example, the signal 114 may indicate whether the vehicle 10 should stop, whether the transmission 15 should be placed in a specific state, and whether the vehicle 10 should move forward, which may be discerned by the sensor array 32. In additional embodiments, the carwash system 100 may have other identifiable characteristics/attributes that may be stored in the storage device 50 for use in determining the presence of the vehicle at the entry to the carwash system 100.

Figure 3:
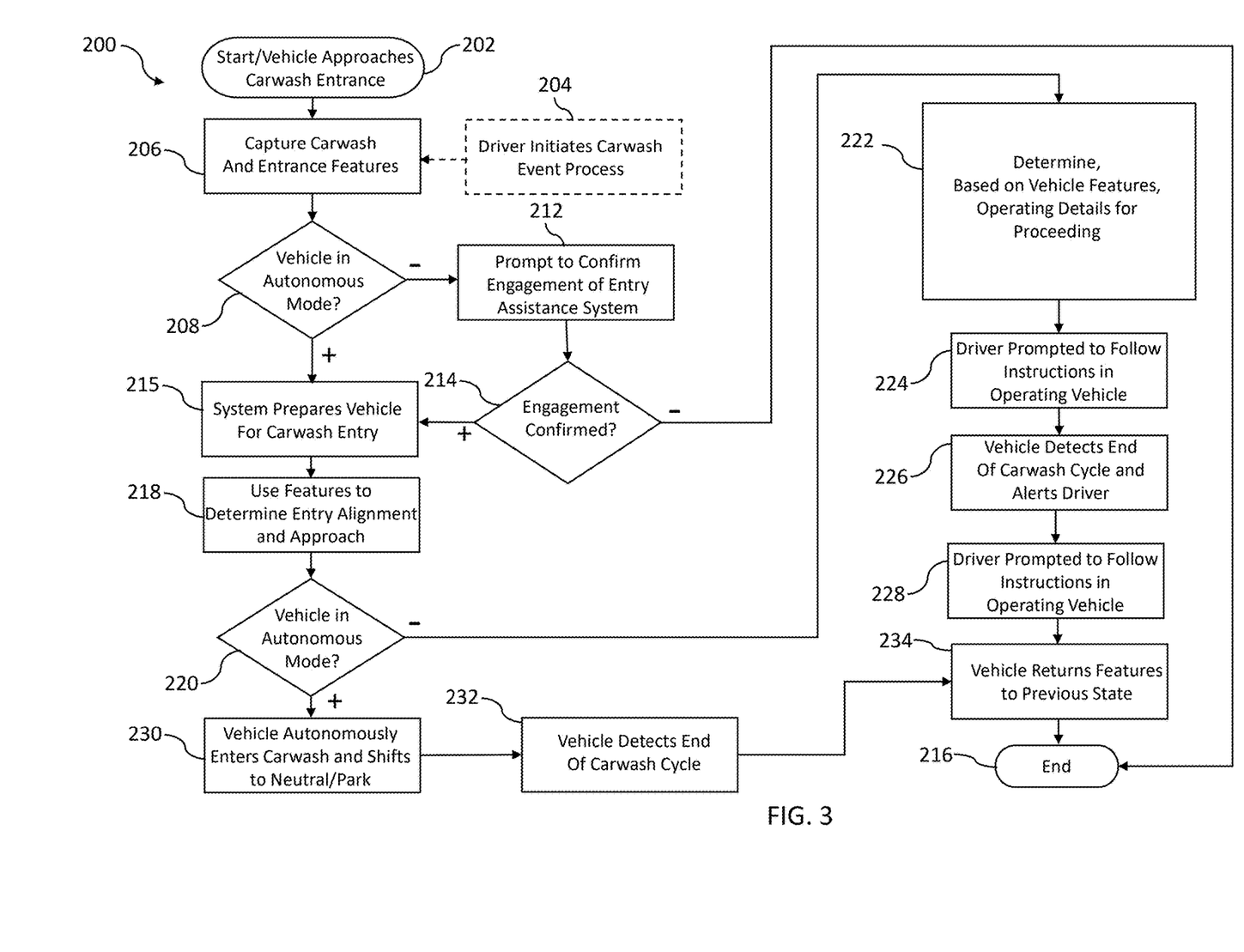
FIG. 3 is a flowchart illustrating a method for car wash entry of the vehicle of FIG. 1 and the process of FIG. 2, in accordance with one or more exemplary embodiments.

Referring to FIG. 3, in addition to FIGS. 1 and 2, a method 200 for detection and entry of the vehicle 10 into the carwash system 100 and is illustrated in flowchart form. As will be appreciated in light of the disclosure, the order of operation within the method 200 is not limited to the sequential execution as illustrated in FIG. 3 but may be performed in one or more varying orders as applicable and in accordance with the present disclosure.

The method 200 starts 202 and may be scheduled to run based on one or more predetermined events or may run whenever the vehicle 10 is operating. In the current embodiment, the method 200 starts 202 when the vehicle 10 approaches a carwash entrance, such as of the carwash system 100. In some embodiments, the location of the carwash system 100 may be entered into a navigation system of the vehicle 10 and upon arrival, the carwash system 100 may be identified by the controller 30 and the start 202 fulfilled. In some embodiments, when the vehicle 10 is autonomously operated the vehicle 10 is aware of its location and the start 202 is fulfilled. In other embodiments, the method 200 identifies the presence of the carwash system 100. The vehicle 10 may use any part of the sensor array 32 whether in camera, radar, lidar, ultrasonic or other form for the identification. The processor 42 of the controller 30 may compare the captured scene to saved feature data in the storage device 50, such as in the stored values 56, and when a match is found to the carwash system 100 the start 202 is fulfilled. The search may be performed using a series of attributes (features extracted from attributes) rather than actual image pixels for better robustness. Once match is found, the method 200 may proceed. In other embodiments the start 202 may be accomplished by other methods, such as by using GPS location data.

In an alternative basing the start 202 on identifying the presence of a carwash in front of the vehicle 10, the operator of the vehicle 10 may provide input 204 to the vehicle carwash detection and entry assistance system 40, such as through the interface 48, to initiate the method 200 when the carwash system 100 is in front of the vehicle 10. The interface 48 may communicate with the operator by any of a number of modes such as a visual/touch screen, sound/voice, or other means.

The method 200 proceeds to capture 206 features of the carwash system 100 and its entrance area. The current embodiment may be described within a camera based sensing system, such as for the capture 206, but may be carried out by other modalities. For example, parts of the method 200, including the capture 206, may also be carried out through ultrasonic parking assist sensors on the front, sides, and rear of vehicle 10. Various systems that capture and identify aspects of the carwash system 100 may be employed to capture 206 scenes, whether as a series of images or otherwise, for analysis on the processor 42 chip to identify the objects of interest such as the entry opening 104, the rails 106, the conveyor 108, the brushes 110, the gantry 112, the signal 114, and/or other attributes/features.

Following the capture 206 of the features of the carwash system 100, the controller 30, such as by the processor 42, determines 208 whether the vehicle 10 is operating in an autonomous mode. When the determination 208 is positive and the vehicle 10 is operating in the autonomous mode, the method 200 proceeds to prepare 210 the vehicle 10 for carwash entry. When the determination 208 is negative and the vehicle 10 is not operating in the autonomous mode, the method 200 proceeds to prompt 212, such as through the interface 48, the driver to confirm engagement of the carwash detection and entry assistance system 40 by the controller 30. The method 200 determines 214 whether the driver has confirmed engagement. When the determination 214 is negative, meaning the driver has declines assistance or entered manual operation without entry assistance, the method 200 ends 216 and the driver controls the vehicle 10 without assistance, and no or limited assistance is provided by the controller 30 to the operator. In embodiments for example, the controller 30 may continue to alert the operator if impacts are incipient while the operator is moving the vehicle 10.

When the determination 214 is positive, meaning the operator has accepted an automatic carwash entry assistance mode of operation by the controller 30, the method 200 proceeds to prepare 215 the vehicle 10 for entry to the carwash system 100. Prior to preparing 215 the vehicle 10, the controller 30 may save, such as in the storage device 50, a profile with the location of the components and/or setting of features of the vehicle 10, prior to entering the carwash system 100. The preparing 215 may include folding-in the outside rearview mirrors 70, moving/verifying the windows 62 are in, or moved to, an up and closed position, moving/verifying the roof panel (sunroof) 64 is in, or moved to, a closed position, and verifying the doors 66 and hatches 68 are in fully closed and latched positions. In embodiments where the vehicle 10 is a convertible, the controller 30 verifies the top is in a fully closed and latched position. As a part of the preparing 215, the controller 30 may also disable various sensors of the sensor array 32. For example, front and rear park assist warning messages may be disabled to avoid unnecessary feedback to the operator of the vehicle 10 when in the carwash system 100.

In embodiments, various other preparing 215 operations may be effected, which may be tailored by the operator through the interface 48. For example, the preparing 215 may be customizable, so that the operator of the vehicle 10 may enter preferences, such as through the interface 48 as to what actions the controller 30 may undertake. In various embodiments, any of the automated aspects of the vehicle carwash detection and entry assistance system 40 may be customizable/optional. In some embodiments, the controller 30 may set the heating, ventilating and air conditioning system to presets selected by the operator of the vehicle 10. In some embodiments, the controller 30 may set the infotainment system of the vehicle 10 to presets, such as station, volume, etc., selected by the operator.

Before, during or following the preparing 215, the method 200 determines 218 the path into the carwash system 100 including approach and alignment. For example, the controller 30 computes the steering angle(s) to result in placing the wheels of the vehicle 10 on the conveyor 108. In other embodiments, the controller 30 computes the steering angle to center the vehicle 10 within the gantry 112. In other embodiments, other attributes/features of the carwash system 100 may be used to compute a path for the vehicle 10 into the carwash system 100.

With the route into the carwash system 100 determined 218, the vehicle carwash detection and entry assistance system 40 is ready for movement of the vehicle 10 into the carwash system 100. The method 200 determines 220 whether the vehicle is in the autonomous mode of operation.

When the determination 220 is negative, meaning the vehicle 10 is not operating autonomously, the method 200 determines 222 the selected operating details. At this step, there are options for proceeding. When the operator of the vehicle 10 has configured, such as through the interface 48, the vehicle carwash detection and entry assistance system 40 for automatic steering and acceleration of the vehicle 10, the controller 30 prompts 224 the operator through the interface 48 to remove hands from the steering system (steering wheel) and refrain from apply pressure to the accelerator and brake pedals.

In embodiments where the vehicle 10 is not equipped with autonomous operation or advanced parking assistance, or where the operator has opted to take control, the controller 30, through the interface 48, may display, as a part of the prompting 224 and via a front view image, guidelines for an optimal path into the carwash system 100 to assist the operator of the vehicle 10 in moving. The guidelines may show the wheel route to assist the operator in properly placing the wheels of the vehicle 10 on the conveyor 108 or in centering the vehicle 10 within the gantry 112, for example. The driver is prompted 224 to follow instructions in operating vehicle 10 in entering the carwash system 100.

Upon the completion of the entry of the vehicle 10 into the carwash system 100, the controller 30, as determined by a zero speed of the vehicle 10 and/or shifting of the transmission 15 into neutral or park, the controller 30 via the interface 48 alerts, such as via the prompting 224, the operator that the vehicle 10 is in place within the carwash system 100. In the case that the vehicle 10 is manually driven by the operator, or when autonomous shifting is not activated, the controller 30, via the interface 48, prompts 224 the operator that they are in control of the vehicle 10 and to shift to park or neutral depending on the type of carwash system detected.

The method 200 may continue by detecting 226 an end of the wash cycle and prompting 228 the operator of the vehicle 10 that the carwash system 100 has completed its cycle. For example, the controller 30, via the sensor array 32 may determine that the signal(s) 114 are indicating exit from the carwash system 100. The controller 30 may restore the park assist warning messaging and set the steering angle to straight forward. The controller 30 may alert the operator, such as via the prompting 228 and by the interface 48, that the carwash is complete. The method 200 prompts 228 the driver to follow instructions in operating the vehicle 10 to exit the carwash system 100. When the vehicle 10 is manually operated, the operator may shift the transmission 15 to drive and move forward.

Returning to the determination 220, when the determination 220 is positive, meaning the vehicle 10 is in the autonomous mode, The vehicle 10 autonomously operates and enters 230 the carwash system 100. The controller 30 operates the systems of the vehicle 10, including steering, accelerator, and braking, to move the vehicle 10 into the carwash system 100 along the determined 218 path using the actuator system 22. As part of the entry 230 operation, the controller 30, via the sensor array 32 may monitor the distance to the attributes/features of the carwash system 100 and may monitor the signal(s) 114 to stop the vehicle 10 at the proper location for the carwash system 100. Data is collected from the sensor array 32 of the vehicle 10. This includes raw data from sensor array 32 on the environment of the vehicle 10, such as from the front camera module 72, LIDAR, RADAR, GPS, and other sensors, along with data from onboard sensors that monitor the status of the vehicle 10, such as speed sensors, steering angle sensors, brake apply sensors, an inertial measurement unit, and other sensors. When the vehicle 10 is moved to position and the carwash system 100 has the conveyor 108, the controller 30 places the transmission 15 in a neutral state. When the carwash system 100 has the gantry 112 that moves over a stationary vehicle, the controller 30 places the transmission 15 in a park state within the wash facility. In the case the vehicle 10 is autonomously driven, the controller 30 remains in control of the vehicle 10. The vehicle 10, via the controller 30 and the sensor array 32 may continue to monitor the signal(s) 114.

The method 200 may continue by detecting 232 an end of the wash cycle. For example, the controller 30, via the sensor array 32 may determine that the signal(s) 114 are indicating exit from the carwash system 100. The controller 30 may alert the operator, such as by the interface 48, that the carwash is complete. When the vehicle is autonomously operated, the controller 30 may shift the transmission 15 to drive and move the vehicle 10 forward.

Upon exit from the carwash system 100, whether autonomously or manually operated, the controller 30 returns 234 the features of the vehicle 10 to their saved pre-carwash state. The controller 30 may unfold the outside rearview mirrors 70. The controller 30, may operate the windshield and rear glass wiper systems to operate through a wipe cycle to clear the glass. The number of wipe cycles may be customized through the interface 48. In embodiments, the controller 30 may reset any moved components or changes features, using the saved profile to pre-carwash settings of the vehicle 10, and the method 200 may end 216.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for carwash detection and entry assistance of a vehicle, the system comprising a controller in the vehicle configured to:
 identify the presence of the vehicle at a wash facility;
 determine whether the vehicle is operating in an autonomous mode;
 prepare, when the vehicle is operating in the autonomous mode, the vehicle for entering the wash facility;
 determine, when the vehicle is not operating in the autonomous mode, whether an operator of the vehicle has accepted entry assistance;
 when the operator has accepted entry assistance, prepare the vehicle for entering the wash facility;
 determine a path into the wash facility;
 determine, when the vehicle is not operating in the autonomous mode, operation of the vehicle based on operator inputs and assist the operator in entering the vehicle into the wash facility via the path, including by prompting the operator to follow instructions in manually operating the vehicle;
 operate, when the vehicle is operating in the autonomous mode, the vehicle into the wash facility via the path;
 control an actuator of the vehicle to align the vehicle in the wash facility using the path;
 prepare the vehicle for entering the wash facility by moving components of the vehicle to predetermined positions compatible with entering the wash facility and disable park assist warning messages to not provide feedback to the operator of the vehicle when in the wash facility;
 determine when the vehicle has exited the wash facility; and
 when the vehicle has exited the wash facility, return the components of the vehicle to a prewash state which is a position of the components of the vehicle before entering the wash facility.

2. The system of claim 1, wherein the predetermined positions include setting an infotainment system of the vehicle to presets.

3. The system of claim 1, wherein the controller is configured to operate a steering actuator of the vehicle to align the vehicle in the wash facility using the path.

4. The system of claim 1, wherein the controller is configured to identify attributes of the wash facility for use in determining the path, including whether the wash facility is a conveyor type or a gantry type, and the controller is configured to control differently for the conveyor type versus the gantry type.

5. The system of claim 1, wherein the controller is configured to:
 not provide the entry assistance when it is determined that the operator has not confirmed engagement of the entry assistance, and allow the operator to control the vehicle without the entry assistance;
 determine, when the vehicle is not operating in the autonomous mode, whether an operator of the vehicle has accepted the entry assistance, including by prompting the operator to confirm engagement of the entry assistance; and
 when it is determined that the operator has not confirmed engagement of the entry assistance, allow the operator to control the vehicle without the entry assistance.

6. The system of claim 1, wherein the controller is configured, through an interface, to alert the operator to release a steering system so that the controller steers the vehicle.

7. The system of claim 1, comprising:
 a sensor system configured to sense a location of a rail of the wash facility; and
 an actuator system configured to operate components of the vehicle,
 wherein the controller is configured to determine the path based on the location of the rail and to move, by the actuator system, the vehicle into the wash facility along the path.

8. The system of claim 1, comprising an interface configured to display information for the operator, wherein the controller is configured to display the path on the interface.

9. The system of claim 1, comprising a sensor system including a speed sensor, and a transmission of the vehicle, wherein the controller is configured to:
 sense, via the sensor system, attributes of the wash facility;
 determine, via the speed sensor, a speed of the vehicle; and
 shift the transmission to one of a park state or a neutral state, a function of the sensed attributes, when the speed of the vehicle is a zero speed.

10. The system of claim 1, wherein the controller is configured to compute steering angles to result in placing wheels of the vehicle on a conveyor of the wash facility.

11. A method for carwash detection and entry assistance, the method comprising:
 identifying, by a controller in a vehicle, the presence of the vehicle at a wash facility;
 determining, by the controller, whether the vehicle is operating in an autonomous mode;
 preparing, by the controller and when the vehicle is operating in the autonomous mode, the vehicle for entering the wash facility;
 determining, by the controller and when the vehicle is not operating in the autonomous mode, whether an operator of the vehicle has accepted entry assistance;
 preparing, when the operator has accepted the entry assistance, the vehicle for entering the wash facility;
 determining, by the controller, a path into the wash facility;
 determining, by the controller and when the vehicle is not operating in the autonomous mode, operation of the vehicle based on operator inputs;
 assisting, by the controller controlling an actuator of the vehicle, the operator with the vehicle entering the wash facility via the path;
 not providing the entry assistance, by the controller and when it is determined that the operator has not confirmed engagement of the entry assistance, and allowing the operator to control the vehicle without the entry assistance;
 determining, when the vehicle is not operating in the autonomous mode, whether the operator of the vehicle has accepted the entry assistance, including by prompting the operator to confirm engagement of entry assistance; and
 when it is determined that the operator has not confirmed engagement of the entry assistance, allowing, by the controller, the operator to control the vehicle without the entry assistance.

12. The method of claim 11, comprising preparing, by the controller, the vehicle for entering the wash facility by moving components of the vehicle to predetermined states compatible with entering the wash facility, wherein the predetermined states include setting an infotainment system of the vehicle to presets.

13. The method of claim 11, comprising operating, by the controller, a steering actuator of the vehicle to align the vehicle in the wash facility using the path.

14. The method of claim 11, comprising identifying, by the controller, attributes of the wash facility for use in determining the path, including determining whether the wash facility is a conveyor type or a gantry type, and controlling differently for the conveyor type versus the gantry type.

15. The method of claim 11, comprising computing, by the controller, steering angles to result in placing wheels of the vehicle on a conveyor of the wash facility.

16. The method of claim 11, comprising alerting, by the controller through an interface, the operator to release a steering system so that the controller steers the vehicle.

17. The method of claim 11, comprising:
sensing, by the controller via a sensor system, a location of a rail of the wash facility;
operating, by the controller via an actuator system, components of the vehicle;
determining, by the controller, the path based on the location of the rail; and
moving, by the controller via the actuator system, the vehicle into the wash facility along the path.

18. The method of claim 11, comprising displaying, by the controller via an interface, information for the operator including the path.

19. The method of claim 11, comprising:
sensing, by the controller via a sensor system, attributes of the wash facility;
disabling park assist warning messages to not provide feedback to the operator of the vehicle when in the wash facility;
determining, by the controller via a speed sensor, a speed of the vehicle; and
shifting, by the controller via a transmission, to one of a park state or a neutral state, as a function of the sensed attributes, when the speed of the vehicle is a zero speed.

20. A vehicle configured for wash detection and entry assistance, the vehicle comprising:
a sensing system configured to sense attributes of the vehicle and of an environment surrounding the vehicle;
an actuator system configured to operate features of the vehicle; and
a controller is configured to:
identify the presence of the vehicle at a wash facility;
determine whether the vehicle is operating in an autonomous mode;
prepare, when the vehicle is operating in the autonomous mode, the vehicle for entering the wash facility;
determine, when the vehicle is not operating in the autonomous mode, whether an operator of the vehicle has accepted entry assistance, including by prompting the operator to confirm engagement of the entry assistance;
when it is determined that the operator has not confirmed engagement of the entry assistance, allowing, by the controller, the operator to control the vehicle without the entry assistance;
when the operator has accepted the entry assistance, prepare the vehicle for entering the wash facility by moving components of the vehicle to predetermined positions compatible with entering the wash facility;
determine a path into the wash facility;
determine, when the vehicle is not operating in the autonomous mode and the operator has accepted the entry assistance, operation of the vehicle based on operator inputs and assist the operator in entering the vehicle into the wash facility via the path, including by prompting the operator to follow instructions in manually operating the vehicle;
operate, when the vehicle is determined to be operating in the autonomous mode, the vehicle into the wash facility via the path;
control an actuator of the vehicle to align the vehicle in the wash facility using the path;
determine when the vehicle has exited the wash facility; and
when the vehicle has exited the wash facility, return the components of the vehicle to a prewash state which is a position of the components of the vehicle before entering the wash facility.

\* \* \* \* \*